United States Patent [19]

Pette

[11] E Patent Number: Re. 32,597

[45] Reissued Date of Patent: Feb. 9, 1988

[54] APPARATUS FOR THE ANAEROBIC PURIFICATION OF WASTE WATER

[75] Inventor: Kees C. Pette, Bennekom, Netherlands

[73] Assignee: Gist-Brocades N.V., Delft, Netherlands

[21] Appl. No.: 834,314

[22] Filed: Feb. 27, 1986

Related U.S. Patent Documents

Reissue of:

[64] Patent No.: 4,253,956
Issued: Mar. 3, 1981
Appl. No.: 40,990
Filed: May 21, 1979

[30] Foreign Application Priority Data

May 23, 1978 [NL] Netherlands ..... 7805584

[51] Int. Cl.[4] ..... B01D 19/00

[52] U.S. Cl. ..... 210/188; 55/159; 210/539

[58] Field of Search ..... 210/150, 151, 200, 201, 210/205, 207, 218, 220, 513, 521, 522, 532.1, 533, 534, 536, 537, 538, 539, 540, 180; 55/159

[56] References Cited

U.S. PATENT DOCUMENTS 3,933,654 1/1976 Middelbeek ..... 210/521

FOREIGN PATENT DOCUMENTS 224976 2/1908 Fed. Rep. of Germany .
254447 11/1910 Fed. Rep. of Germany .

OTHER PUBLICATIONS

Extern; No. 6, pp. 379-395; Jun. 77; Lettinga et al.

*Primary Examiner*—Frank Sever
*Attorney, Agent, or Firm*—Bierman & Muserlian

[57] ABSTRACT

In apparatus for the anaerobic purification of waste water the invention aims at improving the structure and the operation. In known apparatus of this kind there is a reactor tank with one or more aftersettling compartments in the upper part thereof, with inlet and outlet openings for water and sludge into and from the aftersettling compartments from and into the reactor tank respectively. Such apparatus is improved according to the invention be interrupted inclined walls of the aftersettling compartments to form such inlet openings, the wall parts thus formed being staggered at the inlet openings to screen them from rising gas so that this cannot enter the aftersettling compartments, by one such inclined wall extending downwardly past the opposite one to form an outlet opening for the resettling compartments screened against the entry of gas into them, by simple gas collecting hoods, a sludge discharge pipe below the level of the water in such compartments and by removable aftersettling compartments easily replaceable and loosely supported on supporting edges of the reactor tank.

13 Claims, 4 Drawing Figures fig-1
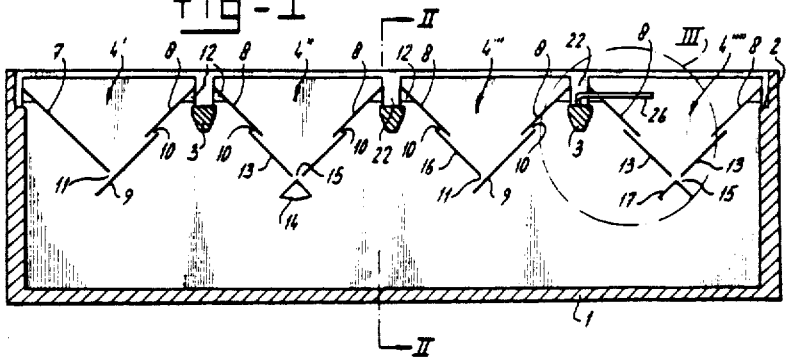
fig-2
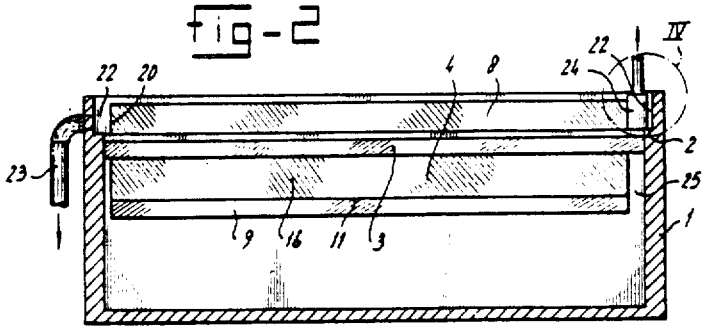
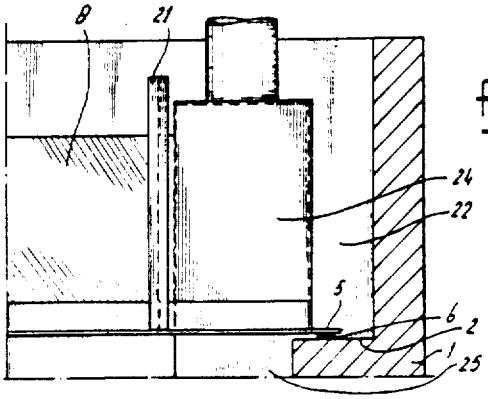
fig-4

APPARATUS FOR THE ANAEROBIC PURIFICATION OF WASTE WATER

Matter enclosed in heavy brackets [ ] appears in the original patent but forms no part of this reissue specification; matter printed in italics indicates the additions made by reissue.

This invention relates to an apparatus for the anaerobic purification of waste water (sewage or industrial waste) with a reactor tank for methane fermentation and an aftersettling (clarification) compartment in the upper part of the reactor tank, said after-settling compartment having a discharge opening in the lower part towards the reactor tank so that active anaerobic sludge separated in the aftersettling compartment is allowed to flow back to the reactor tank, and an entry opening in a higher zone, through which the mixture of said sludge and water is allowed to flow from the reactor tank into the aftersettling compartment, with means to separate the generated gas flowing upwards from the mixture of sludge and water before this mixture flows into the aftersettling compartment.

Such a device is known from Netherlands Patent Application No. 76.06904 of the same applicant. Therein, the gas generated by the fermentative action of the anaerobic sludge exerts a pumping action on the mixture in the reactor tank by its upward movement, to promote or cause circulation of the mixture into, through and out of the aftersettling compartment.

The present invention is based upon the insight that such a device is open to improvement in particular in embodiment and design and in view thereof the invention aims at obtaining such a device which gives a better operation and is more simple in design than known devices of this kind.

In view thereof a device as given in the preamble is according to the invention characterized in that the entry opening of the aftersettling compartment is formed by an interruption in the inclined wall thereof, the parts to both sides of the interruption being at a distance from each other as measured from the lower point of the wall part above the interruption in a direction perpendicular to the wall part below the interruption, so that the opening is screened from gas rising in the reactor tank while allowing the mixture of sludge and water to flow into the aftersettling compartment the lower part of the said wall below the interruption being at a distance from an opposite wall part of the aftersettling compartment to form together therewith the said lower discharge opening.

As the anaerobic sludge has to circulate rapidly in and through the reactor space and in doing so should meet with low resistance only, and from a viewpoint of efficient design, this constitutes a very attractive solution, also giving much less horizontal flow than embodiments according to FIGS. 2 and 3 of the said Netherlands application No. 76.06904, there being less complicating and flow impairing structural parts in said aftersettling compartment that in the embodiment of FIG. 1 of said other application.

The present invention also relates to several preferred embodiments of said principle which will appear in more detail from the description of the drawings and from the claims given below and which will not be mentioned fully in this introduction.

It is, however, remarked that according to a preferred embodiment of the invention a hood for collecting and discharging gas is provided below the said lower discharge opening, which hood also prevents the rising of gas from the reactor tank into the aftersettling compartment. The gas is thus not only deflected to a point outside the reach of said opening, but is also guided to the outside of the device immediately from this zone, so that part of the gas does not participate in the further rising action of the sludge, as usually a much smaller quantity of gas is already sufficient for this gas pumping action.

Moreover it is proposed as a preferred embodiment of the invention to provide a discharge from the reactor tank for part of the sludge through a sludge discharge pipe leading from a point below the normal liquid level in the aftersettling compartment to the outside. This gives a discharge of concentrated sludge from the aftersettling compartment to provide effective discharge of a quantity of said sludge equal to the net growth of the sludge in the device without the risk of discharge of sludge together with the purified water over an overflow weir of the aftersettling compartment, which is easily obtained by providing the entry opening of said discharge pipe in a suitable zone sufficiently far below the liquid level in the aftersettling compartment giving a sufficiently high and thus safe layer of pure liquid above the opening of said pipe. Normally only a few percent of the total quantity of the mixture passing through the device per unit time is discharged through such a pipe and this discharge quantity may be treated in a very small external aftersettler and if desired in filters to yield thick sludge, if desired even substantially dry sludge, and a small quantity of waste water. Said sludge discharge pipe may normally be open, but is preferably closed during most of the time to be opened periodically, e.g. once a week, or to be opened if in the zone before its opening the sludge density or the level of the sludge is measured as being too high. It is also possible to provide programming means for said discharge having a time switch system to open said discharge pipe periodically, if desired in combination with a supplementary opening under the influence of measurements as indicated.

The simple structure of the aftersettling compartment according to the invention is particularly suited for a design of the device in which two or more of such aftersettling compartments are provided one to the side of the other in the upper part of a reactor tank. Such a possibility is as such already given in FIG. 3 of the said prior Netherlands application No. 76.06904. The present invention opens the possibility to build the aftersettling compartments easily as separate units and if desired even in series manufacture, which units may then without more be positioned in a reactor tank e.g. made of concrete and adapted to take up a desired number of such aftersettling compartments. Preferably this is according to the invention realized in such a way that the aftersettling compartment has protruding parts by which it can rest sealingly on a inwardly protruding edge of the reactor tank below the upper edge thereof, so that above this protruding edge there is a space between the walls of the aftersettling compartment and the reactor tank wall which may serve as a collecting and discharge through for the purified effluent. Moreover the walls of the aftersettling compartment and of the reactor tank below said sealing support form a collecting space for gas between them in communication with one or more gas collecting spaces formed between walls of or supported by the aftersettling compartment. In this way maximum simplicity of structure and assembly are obtained. Preferably in this connection all parts which in the total structure guide the flow from and to the aftersettling compartments are connected to said compartments in such a way that they are introduced into the reactor tank and removed therefrom together with said aftersettling compartments as a structural unit. This is of course already an advantage for the lower parts of the inclined walls extending downwards below the interruption as described but may also be applied effectively for the gas collecting and guiding parts, e.g. for the gas collecting and discharge hoods as indicated above, positioned below the connecting opening at the lower end of the aftersettling compartments.

This invention also relates to a separate aftersettling compartment for use in a device as described, in view of this possibility of separate structural units.

The invention will now be explained in more detail with reference to the enclosed drawings giving a preferred embodiment of a device according to the invention. In said drawings:

FIG. 1 is a vertical transverse section through a device according to the invention with several aftersettling compartments one to the side of the other in mutually somewhat differing embodiments;

FIG. 2 is a vertical longitudinal section through this device;

FIG. 4 shows the part IV of FIG. 2 on a larger scale.

Figure 3:
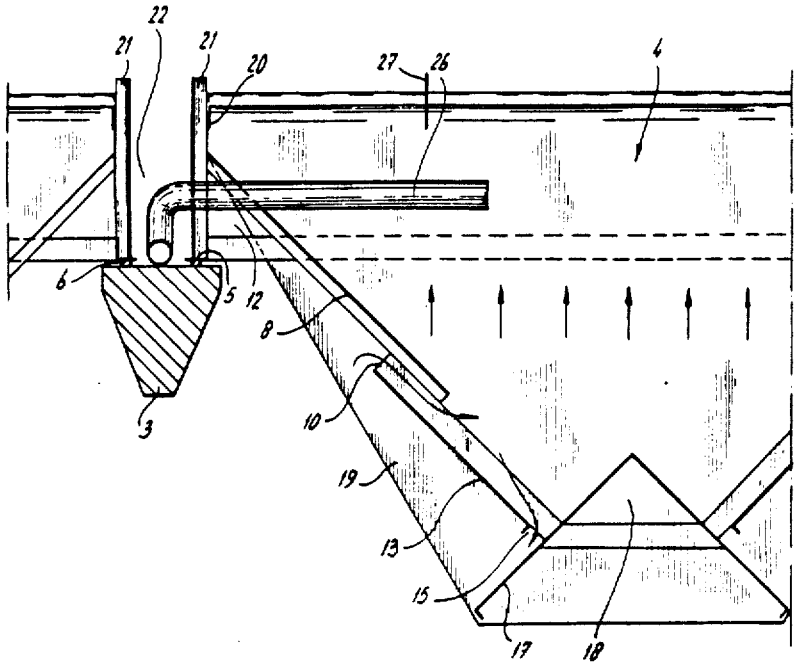
FIG. 3 shows the part III of FIG. 1 on a larger scale.

The reactor tank in the given example is formed by a concrete basin or container 1 which may have any desired dimensions, e.g. in horizontal directions 15 by 20 m and a height of 5 m.

At a height of about 1 m from the top edge this tank has a horizontally stepped part 2. The top faces of three concrete beams 3 extending parallel to each other over the entire length of the basin are positioned at the same height as this part 2.

On said part 2 and said beams 3 four aftersettling compartments 4 are supported, which have different shapes and of which it is assumed in FIG. 1 that they are mutually different although in reality for one single device they will usually be mutually equal. These aftersettling compartments are each embodied as a coherent metal structure being a unit which may be lifted from and positioned into the concrete basin 1. To this end these units have, as shown in FIGS. 3 and 4, as their peripheral edge a plane horizontal flange 5 having at its lower end all around this unit a thick strip 6 being made of relatively soft rubber or similar material and resting on the concrete of the parts 2 and 3 of the basin 1 so that a good sealing of said edge is obtained both against liquid and against gas. There may be lifting eyes, hooks or openings in upstanding wall parts of these units to allow easy lifting of each aftersettling compartments 4 from basin 1 and easy positioning thereof in place in the basin 1.

In transverse section the aftersettling compartments of FIG. 1 have a mutually different shape and they are indicated by reference numerals 4', 4'', 4''' and 4'''' respectively as seen from left to right. Compartment 4' has inclined walls 7 and 8 along which sludge may slide downwardly by its own weight. Wall 8 is interrupted at 10, the part of wall 8 below this interruption being offset with respect to the part thereof above this interruption, so that there is a distance between these parts measured perpendicularly to the wall. The opening thus formed at 10 is an entry opening for the mixture from the reactor tank into the aftersettling compartment 4'. This mixture of sludge and water is lifted by the gas pump action of the gas bubbles formed by fermentation in the reactor tank 1 below compartment 4'. By the described shape and position of the opening 10 in wall 8 this opening is screened by the lower part of wall 8 from the gases, so that they do not pass through this opening but rise into the collecting space 12. The sludge from the aftersettling compartment 4' leaves the latter through opening 11 to return into the reactor space. This opening is formed by the lower part 9 of wall 8 extending downwardly past the lower edge of the opposite wall 7. Gases rising below opening 11 can thus not reach this opening but are deflected to the right by lower part 9 of wall 8.

In the embodiment of the aftersettling compartment indicated by 4'', the second from the left, there are two such interrupted walls 8 forming entry openings 10, and there is symmetry of these walls with respect to the vertical centre plane of the compartment. A closed guide body 14 below central opening 15 prevents gases to rise through said opening. The lower part of walls 8 is indicated by 13.

In the third embodiment from the left, 4''', a combination of the two previous embodiments has been chosen so that the right hand side has a wall 8, opening 10 etc., exactly as in the right hand part of embodiment 4' at the left end in FIG. 1, while the left hand side has a wall 8 embodied in the same way as both walls 8 of embodiment 4'' with a lower wall part here indicated by 16, entry opening 10 and discharge opening 11.

The fourth embodiment 4'''' only differs from the second one, 4'', in that the guide body 14 is replaced by a gas collecting hood 17 in which there is a collecting space 18 (FIG. 3) from which the gas is first guided longitudinally through said hood to the end of the aftersettling compartment and is then guided upwardly to be discharged as will be described.

In FIG. 3 the embodiment 4'''' at the right hand side of FIG. 1 is shown at a larger scale. This also shows reinforcing plates 19, parallel to the plane of the drawing. The plates 8 and 13 having turned edges for strength. There may be such plates 19 e.g. at mutual horizontal distances of 5 m, but in FIG. 2 they have not been shown.

A purified water overflow weir 20 supported by vertical beams 21, which beams 21 may be present at the same positions at the plates 19, allows purified water to overflow from the aftersettling compartment into the trough 22 formed on top of the beams 3 and between adjacent aftersettling compartments or, for the left hand and the right hand aftersettling compartments of FIG. 1, between this compartment and the wall of the concrete basin 1 above the edge 2. Through said troughs 22 which are all connected mutually and with transverse troughs for forming a peripheral trough with intermediary troughs, the water may reach one or more discharges 23 (FIG. 2). The gas collecting spaces 12 and 18 are e.g. closed at one end and connected at their other end to a gas collecting casing 24 which may be open at its bottom. Such a collecting casing may be provided at one end of each gas collecting space 12, so that the gas collected therein flows into such a casing immediately, while from one end of the collecting space 18 there may be a gas duct to the outside or a connection to a space 24, or the gas may be allowed simply to flow upwardly through the liquid in an end space 25 such as shown in FIGS. 2 and 4 to bubble upwardly into a collecting space 24 immediately above this space, which is open in its lower surface.

Excessfluous sludge which is generated by growth of sludge may be discharged by a sludge discharge duct 26 which in FIG. 1 has only been shown for the right hand aftersettling compartment 4'''', but each aftersettling compartment may have one or more of such ducts, e.g. at a height of about 50 cm below the water level. In this case this duct 26 leads to the trough space 22, from which said duct may lead to the outside of the device, e.g. to a small settling and/or filtering device to separate the sludge from the small quantity of water discharged therewith.

The preferred embodiment now to be described contributes considerably to the clarity and purity of the effluent and to a corresponding improvement of the sludge retention in the reactor. This preferred embodiment includes two so-called submerged baffles extending in parallel to the overflow weir 20 and at some distance therefrom. Such a submerged baffle is indicated in FIG. 3 as 27 and consists of a vertical plate submerged in part and to a depth of e.g. 5 to 20 cm from the surface of the water in the aftersettling compartment. The distance of baffle 27 to the center of the aftersettling compartment is chosen in such a way that gas bubbles and floating sludge parts which might be entrained with the liquid, which flows into the aftersettling compartment at 10, will rise in said compartment so as to be trapped between both submerged baffles 27.

I claim:

1. In an apparatus for the anaerobic purification of waste water (sewage or industrial waste) with a reactor tank for methane fermentation and an aftersettling (clarification) compartment in the upper part of the reactor tank, said aftersettling compartment having a discharge opening in the lower part towards the reactor tank so that active anaerobic sludge separated in the aftersettling compartment is allowed to flow back to the reactor tank, and an entry opening in a higher zone, through which the mixture of said sludge and water is allowed to flow from the reactor tank into the aftersettling compartment, with means to separate the generated gas flowing upwards from the mixture of sludge and water before this mixture flows into the aftersettling compartment, the improvement comprising an interruption in the inclined wall of said after setting compartment forming said entry opening, the parts to both sides of the interruption being at a distance from each other as measured from the lower part of the wall part above the interruption in a direction perpendicular to the wall part below the interruption said distance being sufficient, so that the opening is screened from gas rising in the reactor tank while allowing the mixture of sludge and water to flow into the aftersettling compartment, the lower part of the said wall below the interruption being at a distance from an opposite wall part of the aftersettling compartment to form together therewith the said lower discharge opening, *means enabling the substantial separation of the gas from the mixture of sludge and water and means to keep the sludge, still containing gas, in the middle part of the after settling compartment, including the overlap of said wall parts, the lowest point of one wall part above the interruption is positioned lower than the highest point of the other wall part below the interruption and, a submerged baffle intersecting the liquid level in the afersettling compartment between a point right above the zone where the sludge-water-mixture enters the aftersettling compartment and the discharge for purified water therefrom.*

2. An apparatus according to claim 1, wherein said wall past below the interruption extends downwardly past the lower edge of said opposite wall part to screen the discharge opening in the lower part of the aftersettling compartment towards the reactor tank against the entry of gas from said tank into said compartment.

3. An apparatus according to claim 1 or claim 2, wherein at least in two opposite downwardly converging walls of the aftersettling compartment such an interruption is provided.

4. An apparatus according to claim 3, characterized in that a hood for collecting and discharging gas is provided below the said lower discharge opening, which hood also prevents the rising of gas from the reactor tank into the aftersettling compartment.

5. An apparatus according to claim 4, wherein a sludge discharge pipe leads from a point below the normal liquid level in the aftersettling compartment to the outside of the apparatus.

6. An apparatus according to claim 5, wherein said sludge discharge pipe has closing means connected to sensing or time switching means to open and close said closing means temporarily and/or periodically.

[7. An apparatus according to claim 6, wherein a submerged baffle intersects the liquid level in the aftersettling compartment between a point right above the zone where the sludge-water-mixture enters the aftersettling compartment and the discharge for purified water therefrom.]

8. An apparatus according to claim [7] *1*, in which the discharge of purified water is positioned at the top of the said inclined interrupted wall of the aftersettling compartment, the submerged baffle being positioned above the same wall, farther from the central zone of the aftersettling compartment than said entry opening for the sludge-water-mixture into this compartment.

9. An apparatus according to claim 8, which comprises one or more aftersettling compartments, each embodied as a structural unit being adapted to be separately introduced into the reactor tank downwardly and removed therefrom upwardly.

10. An apparatus according to claim 9, wherein an aftersettling compartment has protruding parts by which it can rest sealingly on an inwardly protruding edge of the reactor tank below the upper edge thereof, so that above this protruding edge there is a space between the walls of the aftersettling compartment and the reactor tank wall which may serve as a collecting and discharge trough for the purified effluent.

11. An apparatus according to claim 10, wherein the walls of the aftersettling compartment and of the reactor tank below said sealing support form a collecting space for gas between them in communication with one or more gas collecting spaced formed between walls of or supported by the aftersettling compartment.

12. An apparatus according to claim 11, with a rectangular horizontal section of the aftersettling compartment, wherein said gas collecting spaces formed by parts of the aftersettling compartments are rectangular in horizontal section and open freely at one or both ends into or below said gas collecting spaces formed between the walls of the aftersettling compartment and the reactor tank.

13. An aftersettling compartment as a separate structural unit for use in an apparatus according to claim 9.

* * * * *